US012120051B2

United States Patent
Inoue et al.

(10) Patent No.: US 12,120,051 B2
(45) Date of Patent: *Oct. 15, 2024

(54) MTC-IWF ENTITY, SCS ENTITY, SIGNALING METHOD, AND COMPUTER READABLE MEDIUM

(71) Applicant: NEC Corporation, Tokyo (JP)

(72) Inventors: Tetsuo Inoue, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,541

(22) Filed: Aug. 29, 2022

(65) Prior Publication Data

US 2022/0416973 A1 Dec. 29, 2022

Related U.S. Application Data

(63) Continuation of application No. 14/653,532, filed as application No. PCT/JP2013/007245 on Dec. 10, 2013, now Pat. No. 11,463,211.

(30) Foreign Application Priority Data

Dec. 21, 2012 (JP) .................. 2012-280029

(51) Int. Cl.
*H04L 5/00* (2006.01)
*H04W 4/00* (2018.01)
(Continued)

(52) U.S. Cl.
CPC ............. *H04L 5/0048* (2013.01); *H04W 4/70* (2018.02); *H04W 8/12* (2013.01); *H04W 48/08* (2013.01); *H04W 72/20* (2023.01); *H04W 84/04* (2013.01)

(58) Field of Classification Search
CPC ...... H04L 5/0048; H04W 8/12; H04W 48/08; H04W 72/0406; H04W 84/04; H04W 4/005
See application file for complete search history.

(56) References Cited

U.S. PATENT DOCUMENTS 9,554,233 B2 1/2017 Him .................... H04W 74/085
10,368,340 B2 7/2019 La ...................... H04N 21/6582
(Continued)

FOREIGN PATENT DOCUMENTS

JP 2001-014297 A 1/2001
JP 2002-511671 A 4/2002
(Continued)

OTHER PUBLICATIONS

Japanese Decision to Grant a Patent Issued in Japanese Patent Application No. 2019-011825, dated Dec. 10, 2019, 5 pages.
(Continued)

*Primary Examiner* — Hoang-Chuong Q Vu

(57) ABSTRACT

A Machine Type Communication Inter Working Function (MTC-IWF) entity (1) includes a trigger controller (11) and a notification service controller (12). The trigger controller (11) controls a device trigger of an MTC device (3) requested from an SCS entity (2). The notification service controller (12) is configured to send, to the SCS entity (2), a subscription request for a notification service including providing a PLMN (5) with management information which is collected outside (4) the PLMN (5) regarding the MTC device (3), and receive, from the SCS entity, a message containing the management information (2) when the subscription request has been accepted. Accordingly, it is possible to contribute to, for example, improvement in collaborative and cooperative operations between the PLMN and an M2M service layer.

16 Claims, 8 Drawing Sheets

(51) Int. Cl.
  *H04W 4/70*    (2018.01)
  *H04W 8/12*    (2009.01)
  *H04W 48/08*   (2009.01)
  *H04W 72/04*   (2023.01)
  *H04W 72/20*   (2023.01)
  *H04W 84/04*   (2009.01)

(56) References Cited

U.S. PATENT DOCUMENTS

| | | | |
|---|---|---|---|
| 2002/0028671 A1 | 3/2002 | I' Anson et al. | H04W 4/02 455/414.1 |
| 2004/0081120 A1 | 4/2004 | Chaskar | |
| 2004/0137918 A1 | 7/2004 | Varonen | H04W 8/10 455/456.2 |
| 2004/0203630 A1 | 10/2004 | Wang | |
| 2008/0170563 A1 | 7/2008 | Lei | H04L 29/06027 |
| 2009/0274116 A1 | 11/2009 | Cho | H04W 64/00 370/331 |
| 2010/0184428 A1* | 7/2010 | Luo | H04W 8/08 455/433 |
| 2011/0270973 A1* | 11/2011 | Liao | H04W 4/50 709/224 |
| 2012/0202508 A1 | 8/2012 | Toth | H04W 4/00 455/450 |
| 2012/0220326 A1* | 8/2012 | Li | H04W 8/22 455/517 |
| 2012/0322412 A1* | 12/2012 | Qiang | H04W 12/06 455/411 |
| 2013/0017829 A1* | 1/2013 | Kim | H04W 60/06 455/458 |
| 2013/0039245 A1 | 2/2013 | Jamadagni | H04W 74/04 370/311 |
| 2013/0039277 A1* | 2/2013 | Li | H04L 25/202 370/328 |
| 2013/0044596 A1* | 2/2013 | Zhi | H04W 12/08 370/230 |
| 2013/0070775 A1 | 3/2013 | Qu | H04W 4/08 370/401 |
| 2013/0078950 A1* | 3/2013 | Liao | H04W 12/086 455/411 |
| 2013/0083753 A1 | 4/2013 | Lee | H04W 72/0453 370/329 |
| 2013/0088956 A1 | 4/2013 | Zhou | H04W 28/02 370/230 |
| 2013/0095837 A1* | 4/2013 | Zhou | H04W 64/00 455/466 |
| 2013/0115893 A1 | 5/2013 | Hletalahti | H04W 48/02 455/68 |
| 2013/0165101 A1* | 6/2013 | Han | H04W 76/27 455/418 |
| 2013/0208661 A1 | 8/2013 | Nylander | H04W 48/18 370/328 |
| 2013/0322239 A1* | 12/2013 | Zhi | H04W 28/0284 370/230 |
| 2014/0003313 A1* | 1/2014 | Jain | H04L 5/0055 370/311 |
| 2014/0029515 A1 | 1/2014 | Akko | H04W 76/12 370/328 |
| 2014/0044030 A1 | 2/2014 | Famachandran | H04W 52/0235 370/311 |
| 2014/0050084 A1 | 2/2014 | Cheng | H04W 28/0215 370/312 |
| 2014/0086219 A1 | 3/2014 | Suzuki | H04W 56/0045 370/336 |
| 2014/0092808 A1 | 4/2014 | Jain | H04W 52/0258 370/328 |
| 2014/0134996 A1* | 5/2014 | Barclay | G06F 9/4881 455/422.1 |
| 2014/0269779 A1 | 9/2014 | Shan | H04W 28/24 370/509 |
| 2014/0304777 A1* | 10/2014 | Lehtovirta | H04W 4/70 726/3 |
| 2014/0355542 A1* | 12/2014 | Zhang | H04W 4/027 370/329 |
| 2015/0050955 A1 | 2/2015 | Kim | H04W 4/005 455/518 |
| 2015/0131437 A1 | 5/2015 | Kim | H04W 28/12 370/230 |
| 2015/0156624 A1 | 6/2015 | Yang | H04W 68/00 455/411 |
| 2015/0230063 A1 | 8/2015 | Chandramouli | H04L 12/1845 455/466 |
| 2015/0256349 A1 | 9/2015 | Kim | H04W 60/00 370/259 |
| 2015/0282145 A1* | 10/2015 | Kim | H04W 72/20 455/450 |
| 2015/0289078 A1* | 10/2015 | Kim | H04W 8/02 455/422.1 |
| 2015/0341898 A1 | 11/2015 | Xu | H04W 4/005 455/458 |
| 2016/0142860 A1* | 5/2016 | Kim | H04W 80/02 455/435.1 |
| 2017/0311304 A1 | 10/2017 | Chi-Chang | H04N 21/44231 |

FOREIGN PATENT DOCUMENTS

| | | |
|---|---|---|
| JP | 2005-521299 | 7/2005 |
| WO | WO-2003-079655 | 9/2003 |
| WO | WO-2014-006803 | 1/2014 |

OTHER PUBLICATIONS

CATT "Solution of UE Based Monitoring", SA WG2 Temporary Document, S2-124356 (revision of S2-12xxxx), New Orleans, USA Nov. 12-16, 2012, pp. 1-4 (4 pages).
Notification of Reasons for Refusal issued by the Japan Patent Office for Japanese Applicaton No. 2017-214420 dated Aug. 14, 2018 (6 pages).
Japanese Office Action issued by the Japan Patent Office for Japanese Application No. 2014-552909 dated Oct. 10, 2017 (6 pages).
Motorola Mobility, "Key Issue: Supporting Different MTC Enablement Frameworks," SA WG2 Meeting #93, S2-123769, Agenda Item 8.2.1, Sofia, Bulgaria, Oct. 8-12, 2012 (3 pages).
ZTE, LG Electronics, Intel, "Report MTC Monitoring Event using T5 and Tsp," SA WG2 Meeting #93, S2-124173, Agenda Item 8.2.2, Sofia, Bulgaria, Oct. 8-12, 2012 (6 pages).
International Search Report corresponding to PCT/JP2013/007245, mail date Mar. 18, 2014, 1 page.
3GPP TS 23.682 V11.2.0; 3rd Generation Partnership Project; Technical Specification Group Services and System Aspects; Architecture enhancements to facilitate communications with packet data networks and applications (Release 11), (Sep. 2012), pp. 1-29.
3GPP TS 23.682 V11.3.0; 3rd Generation Partnership Project; Technical Specification Group Services and System Aspects; Architecture enhancements to facilitate communications with packet data networks and applications (Release 11), (Dec. 2012), pp. 1-29.
3GPP TS 29.368 V11.0.0: 3rd Generation Partnership Project; Technical Specification Group Core Network and Terminals; Tsp interface protocol between the MTC Interworking Function (MTC-IWF) and Service Capability Server (SCS) (Release 11), (Sep. 2012), pp. 1-21.
Alcatel-Lucent "Discussion paper on Tsp interface based on HTTP transport", 3GPP TSG-CT WG3 Meeting #88-BIS, C3-120587, Taipei, Taiwan, Apr. 16-20, 2012, 10 pages.
Japan Notice of Reasons for Refusal issued in Japanese Patent Application No. 2020-001214, dated Oct. 27, 2020, 5 pages.
Japanese Decision to Grant a Patent issued in Japanese Patent Application No. 2019-011826, dated Dec. 10, 2019, 5 pages.
JP Office Action for JP Application No. 2022-017430, mailed on Dec. 13, 2022 with English Translation.
Huawei, CATR, Network improvements for MTC Monitoring, 3GPP TSG-SA WG2#78 S2-101075, Feb. 16, 2010.
Huawei, Hisilicon, ZTE, Identifier Translation, 3GPP TSG-SA WG2#86 S2-113749, Jul. 13, 2011.

(56) References Cited

OTHER PUBLICATIONS

Japanese Office Action for JP Application No. 2022-017430 mailed on Feb. 28, 2023 with English Translation.
NEC, Location update for non attached MTC Devices, 3GPP TSG-SA WG2#83, S2-110412, Feb. 15, 2011.
NEC, Location update for non attached MTC Devices, 3GPP TSG-SA WG2#84, S2-111396, Apr. 6, 2011.
NEC, Location update for non attached MTC Devices, 3GPP TSG-SA WG2#85, S2-112254, May 11, 2011.
InterDigital Communications, Recommended approach for triggering detached devices, 3GPP TSG-SA WG2#84, S2-111797, Apr. 6, 2011.

* cited by examiner

MTC-IWF ENTITY, SCS ENTITY, SIGNALING METHOD, AND COMPUTER READABLE MEDIUM

CROSS-REFERENCE TO RELATED APPLICATIONS

The present application is a continuation application of U.S. patent application Ser. No. 14/653,532 filed on Jun. 18, 2015, which is a National Stage Entry of international application PCT/JP2013/007245 filed on Dec. 10, 2013, which claims the benefit of priority from Japanese Patent Application No. 2012-280029 filed on Dec. 21, 2012, the disclosures of all of which are incorporated in their entirety by reference herein.

TECHNICAL FIELD

The present invention relates to a radio communication network that supports a Machine Type Communication (MTC).

BACKGROUND ART

The Third Generation Partnership Project (3GPP), the European Telecommunications Standards Institute (ETSI) and the like have examined the standardization of the MTC. The MTC is also called a Machine-to-Machine (M2M) network or a sensor network. The 3GPP defines a mobile station (user equipment (UE)) implemented in a machine and a sensor for the MTC as an "MTC device". The MTC device is typically arranged in various types of equipment including machines (e.g., vending machines, gas meters, electric meters, vehicles, railway vehicles) and sensors (e.g., environmental, agricultural, or traffic sensors). The MTC device is connected to a Public Land Mobile Network (PLMN) and communicates with an MTC application server (AS). The MTC application server is arranged outside the PLMN (external network), executes an MTC application, and communicates with an MTC UE application implemented in the MTC device. The MTC application server is typically controlled by an MTC service provider (M2M service provider).

The 3GPP defines a network architecture including a Service Capability Server (SCS) and a Machine Type Communication Inter Working Function (MTC-IWF), and reference points (interfaces) related to them to allow the MTC application server to communicate with the MTC device (see Non-patent literature 1 and 2). The SCS is an entity to connect the MTC application server to the 3GPP PLMN and to allow the MTC application server to communicate with a UE (i.e., MTC device) through a PLMN service defined by the 3GPP. Further, the SCS allows the MTC application server to communicate with the MTC-IWF. The SCS is assumed to be controlled by an operator of the PLMN or the MTC service provider.

The MTC-IWF is a control plane entity that belongs to the PLMN. The MTC-IWF has a connection with the SCS and connections with nodes in the PLMN (e.g., Home Subscriber Server (HSS), a Short Message Service-Service Center (SMS-SC), a Serving GPRS Support Node (SGSN), a Mobility Management Entity (MME), and a Mobile Switching Center (MSC)). The MTC-IWF serves as a control plane interface to allow the 3GPP PLMN and the M2M service layer including the SCS to cooperate (interwork) with each other while hiding the details of the topology of the 3GPP PLMN.

The reference point (interface) between the MTC-IWF and the SCS is defined as a Tsp reference point. Non-patent literature 1 and 2 define the details of the Tsp reference point. More specifically, the following two procedures are provided at the Tsp reference point:
 a request and a confirmation of a device trigger; and
 a notification and a confirmation of a result of the device trigger request.

The device trigger means delivery of trigger messages from the MTC application server to the MTC device. The SCS sends a Device-Action-Request (DAR) command to the MTC-IWF to request the device trigger. The MTC-IWF receives the DAR command from the SCS, checks the status of the DAR command, and sends a Device-Action-Answer (DAA) command to the SCS. The DAA command indicates whether the device trigger request (i.e., DAR command) is acceptable.

When the device trigger request is accepted, the MTC-IWF exchanges signaling messages with a node in the PLMN to deliver the trigger message to the MTC device. The MTC-IWF then sends, to the SCS, a Device-Notification-Request (DNR) command indicating the result of the trigger message delivery. The DNR command indicates a success or a failure of the trigger message delivery. The SCS sends a Device-Notification-Answer (DNA) command to the MTC-IWF to notify the MTC-IWF of the reception of the DNR command.

CITATION LIST

Non Patent Literature

[Non-Patent Literature 1] 3GPP TS 23.682 V11.2.0 (2012-09) "Architecture enhancements to facilitate communications with packet data networks and applications (Release 11)"

[Non-Patent Literature 2] 3GPP TS 29.368 V11.0.0 (2012-09) "Tsp interface protocol between the MTC Interworking Function (MTC-IWF) and Service Capability Server (SCS) (Release 11)"

SUMMARY OF INVENTION

Technical Problem

The present inventors have carried out various studies about collaborative and cooperative operations between the PLMN and the M2M service layer (e.g., MTC application server). In one scenario of the M2M service, the PLMN may preferably use management information collected in the M2M service layer regarding the UE (MTC device). For example, the PLMN may use statistical communication properties or mobility properties of the UE (M2M device) collected in the M2M service layer to optimize connection management or mobility management of the UE (M2M device) in the PLMN. In another scenario of the M2M service, the M2M service layer may preferably use management information collected in the PLMN regarding a UE (MTC device).

As already described above, however, the 3GPP defines only using the DAR command, the DAA command, the DNR command, and the DNA command at the Tsp reference point to send the device trigger request and to report the result of the device trigger. These four commands are not sufficient to transfer the management information collected in the M2M service layer regarding the UE (MTC device) or the management information collected in the PLMN regarding the UE (MTC device) between the PLMN and the M2M service layer.

One object of the present invention is to provide an MTC-IWF entity, an SCS entity, a signaling method, and a program that contribute to improvement in collaborative and cooperative operations between the PLMN and the M2M service layer.

Solution to Problem

In a first aspect, an MTC-IWF entity includes a trigger controller and a notification service controller. The trigger controller is configured to receive a trigger request to trigger an MTC device from an SCS entity, exchange signaling messages with a node in a PLMN to execute trigger message delivery to the MTC device based on the trigger request, and send a result of the trigger message delivery to the SCS entity. The notification service controller is configured to send, to the SCS entity, a subscription request for a notification service including providing the PLMN with management information which is collected outside the PLMN regarding the MTC device, and receive a message containing the management information from the SCS entity when the subscription request has been accepted.

In a second aspect, an SCS entity includes a trigger controller and a notification service controller. The trigger controller is configured to send to an MTC-IWF entity a trigger request to trigger an MTC device, and receive from the MTC-IWF entity a result of trigger message delivery to the MTC device based on the trigger request. The notification service controller is configured to receive from the MTC-IWF entity a subscription request for a notification service including providing a PLMN with management information which is collected outside the PLMN regarding the MTC device, and send a message containing the management information to the MTC-IWF entity when the subscription request has been accepted.

In a third aspect, a signaling method between an MTC-IWF entity and an SCS entity includes:
  (a) sending, from the MTC-IWF entity to the SCS entity, a subscription request for a notification service including providing a PLMN with management information which is collected outside the PLMN regarding an MTC device; and
  (b) receiving, by the MTC-IWF entity from the SCS entity, a message containing the management information when the subscription request has been accepted.

In a fourth aspect, a program includes instructions for causing a computer to execute the signaling method according to the third aspect stated above.

In a fifth aspect, an MTC-IWF entity includes a trigger controller and a notification service controller. The trigger controller is configured to receive a trigger request to trigger an MTC device from an SCS entity, exchange signaling messages with a node in a PLMN to execute trigger message delivery to the MTC device based on the trigger request, and send a result of the trigger message delivery to the SCS entity. The notification service controller is configured to receive, from the SCS entity, a subscription request for a notification service including providing the SCS entity with management information which is collected by the PLMN regarding the MTC device or the PLMN, and send a message containing the management information to the SCS entity when the subscription request has been accepted.

In a sixth aspect, an SCS entity includes a trigger controller and a notification service controller. The trigger controller is configured to send to an MTC-IWF entity a trigger request to trigger an MTC device, and receive from the MTC-IWF entity a result of trigger message delivery to the MTC device based on the trigger request. The notification service controller is configured to send to the MTC-IWF a subscription request for a notification service including providing the SCS entity with management information which is collected by a Public Land Mobile Network (PLMN) regarding the MTC device or the PLMN, and receive a message containing the management information from the MTC-IWF entity when the subscription request has been accepted.

In a seventh aspect, a signaling method between an MTC-IWF entity and an SCS entity includes:
  (a) receiving, by the MTC-IWF entity from the SCS entity, a subscription request for a notification service including providing the SCS entity with management information which is collected by a PLMN regarding an MTC device or the PLMN; and
  (b) when the subscription request has been accepted, sending a message containing the management information from the MTC-IWF entity to the SCS entity.

In an eighth aspect, a program includes instructions for causing a computer to execute the signaling method according to the seventh aspect stated above.

Advantageous Effects of Invention

According to the aforementioned aspects, it is possible to provide an MTC-IWF entity, an SCS entity, a signaling method, and a program that contribute to improvement in collaborative and cooperative operations between the PLMN and the M2M service layer.

DESCRIPTION OF EMBODIMENTS

Hereinafter, with reference to the drawings, specific embodiments will be described in detail. Throughout the drawings, the same or corresponding components are denoted by the same reference symbols, and the overlapping descriptions will be omitted as appropriate for the sake of clarification of the description.

First Embodiment

Figure 1:
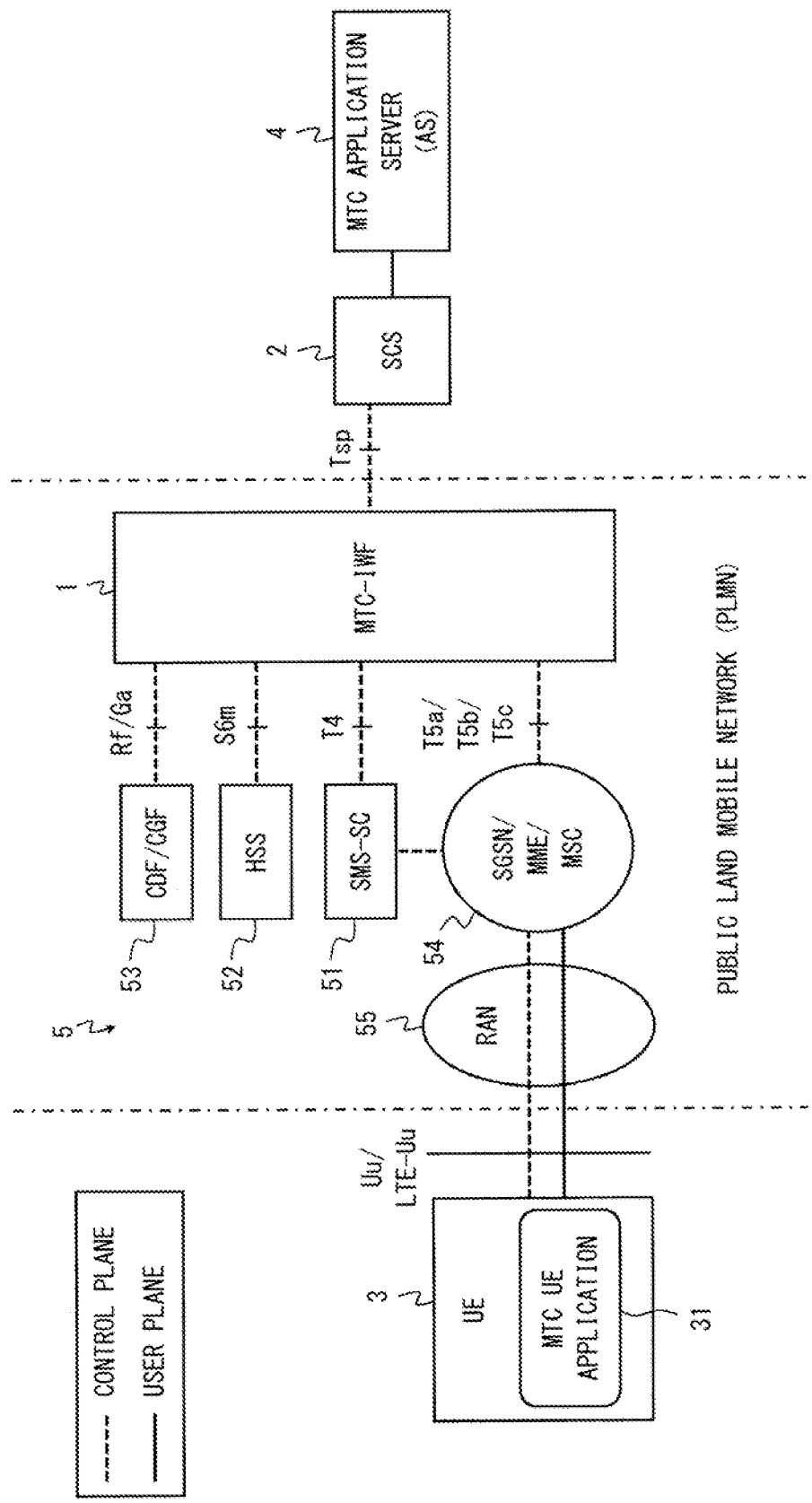
FIG. 1 is a diagram showing a configuration example of a radio communication network that supports an MTC.

FIG. 1 is a diagram showing a configuration example of a radio communication network according to an embodiment. In one example, the radio communication network according to the embodiment is a 3GPP Universal Mobile Telecommunications System (UMTS) network or a Long Term Evolution (LTE) network.

An MTC-IWF entity 1 is a control plane entity that belongs to a PLMN 5. The MTC-IWF entity 1 has a connection with an SCS entity 2 via a Tsp reference point. The Tsp reference point is, for example, an Application Programming Interface (API) and uses a Diameter-based protocol. Further, the MTC-IWF entity 1 has connections with nodes in the PLMN 5. In the example shown in FIG. 1, the MTC-IWF entity 1 has a connection with an SMS-SC via a T4 reference point, a connection with an HSS via an S6m reference point, a connection with a Charging Data Function/Charging Gateway Function (CDF/CGF) via an Rf/Ga reference point, and a connection with a core network node 54 such as an SGSN, an MME, and an MSC via a T5a/T5b/T5c reference point. The MTC-IWF entity 1 may be a single independent physical entity or may be a functional entity added to another network element (e.g., an HSS or an MME).

The SCS entity 2 connects an MTC application server 4 to the PLMN 5 to allow the MTC application server 4 to communicate with a UE 3 (i.e., MTC device) through a PLMN service defined by the 3GPP. Further, the SCS entity 2 allows the MTC application server 4 to communicate with the MTC-IWF entity 1. The SCS entity 2 is controlled by an operator of the PLMN 5 or an MTC service provider. The SCS entity 2 is also called an MTC server or an M2M server. The SCS entity 2 may be a single independent physical entity or may be a functional entity added to another network element (e.g., the MTC application server 4).

The UE 3 executes an MTC UE application 31 and serves as an MTC device. The UE 3 as an MTC device is connected to the core network node 54 through a RAN 55 and communicates with the MTC application server 4. The UE 3 may be an MTC gateway device. The MTC gateway device has a 3GPP mobile communication function (i.e., functions of a mobile station) and is connected to another device (e.g., a sensor, a radio frequency identification (RFID) tag, or a car navigation device) by a personal/local area connection technology. Specific examples of the personal/local area connection technology include IEEE 802.15, ZigBee, Bluetooth, and IEEE 802.11a. The other device connected to the MTC gateway device is typically a device that does not has the 3GPP mobile communication function, but may be a device that has the 3GPP mobile communication function (i.e., an MTC device).

In this description, the term "MTC device" and the term "MTC gateway device" are not particularly distinguished from each other. That is, the term "MTC device" used in this description includes the MTC gateway device. Therefore, the UE 3 as the MTC device also means the UE 3 as the MTC gateway device.

The MTC-IWF entity 1 and the SCS entity 2 carry out, at the Tsp reference point, a request and a confirmation of a device trigger, and a notification and a confirmation of a result of the device trigger request. More specifically, the MTC-IWF entity 1 receives from the SCS entity 2 the device trigger request to trigger the UE 3 as the MTC device. Next, the MTC-IWF entity 1 exchanges signaling messages with a node in the PLMN 5 to execute trigger message delivery to the UE 3 based on the device trigger request. In the 3GPP, for example, the T4 reference point or the T5 (T5a, T5b, or T5c) reference point is used to deliver the trigger message. When the T4 reference point is used, the MTC-IWF entity 1 sends a trigger message delivery request to the SMS-SC 51. Meanwhile, when the T5 reference point is used, the MTC-IWF entity 1 sends the trigger message delivery request to the core network node 54. The MTC-IWF entity 1 then receives a result of the trigger message delivery from the SMS-SC 51 or the core network node 54 and sends the result of the trigger message delivery to the SCS entity 2.

Figure 2:
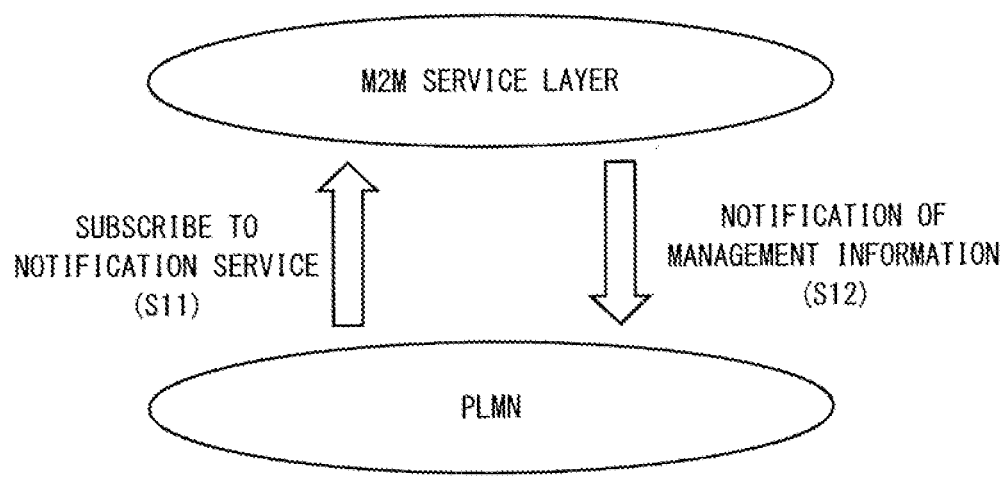
FIG. 2 is a conceptual diagram showing one example of processing in which a PLMN subscribes to a notification service provided by an M2M service layer.

Further, in this embodiment, processing for subscribing to a notification service of management information and transfer of the management information based on the notification service are performed between the PLMN 5 and the M2M service layer. The M2M service layer includes the MTC application server 4. In a first example, the PLMN 5 subscribes to a notification service provided by the M2M service layer. FIG. 2 is a conceptual diagram showing one example of processing related to the first example. The PLMN 5 sends a subscription request for the notification service to the M2M service layer (S11). The PLMN 5 may send the subscription request for the notification service through the reference point Tsp between the MTC-IWF entity 1 and the SCS entity 2. The M2M service layer may send, to the PLMN 5, information indicating whether or not the subscription request has been accepted. When the subscription request has been accepted, the M2M service layer sends, to the PLMN 5, the management information which is collected outside the PLMN 5 (i.e., management information collected by the M2M service layer) regarding the UE 3 (S12). The M2M service layer may send the management information through the reference point Tsp.

Figure 3:
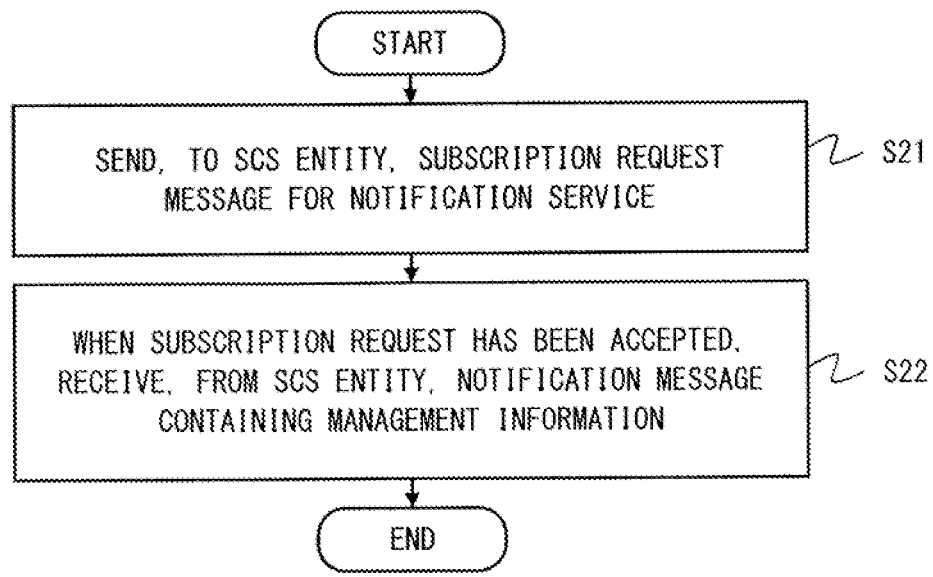
FIG. 3 is one example of a flowchart showing an operation of an MTC-IWF to subscribe to the notification service provided by the M2M service layer.

FIG. 3 is one example of a flowchart showing an operation of the MTC-IWF entity 1 to subscribe to the notification service provided by the M2M service layer. In the example shown in FIG. 3, the subscription request for the notification service and the management information are transferred through the reference point Tsp. Specifically, in Step S21, the MTC-IWF entity 1 sends a subscription request message for the notification service to the SCS entity 2 through the reference point Tsp. In Step S22, when the subscription request has been accepted by the M2M service layer, the MTC-IWF entity 1 receives a notification message containing the management information from the SCS entity 2 through the reference point Tsp.

Figure 4:
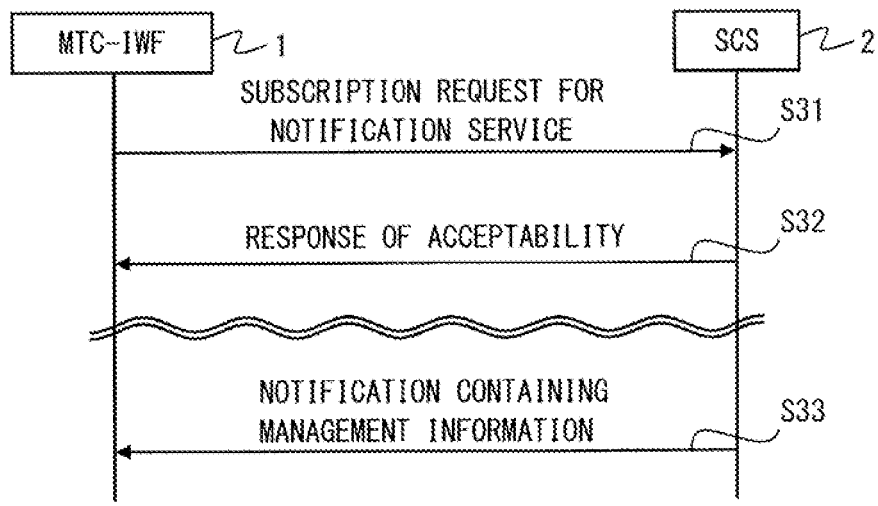
FIG. 4 is one example of a sequence diagram showing processing in which the PLMN subscribes to the notification service provided by the M2M service layer.

FIG. 4 is one example of a sequence diagram showing processing in which the PLMN 5 subscribes to the notification service provided by the M2M service layer. In Step S31, the MTC-IWF entity 1 sends the subscription request for the notification service to the SCS entity 2. In Step S32, the SCS entity 2 sends to the MTC-IWF entity 1 a response message indicating whether or not the subscription request has been accepted. In Step S33, when the subscription request has been accepted, the SCS entity 2 sends the notification message containing the management information to the MTC-IWF entity 1.

Figure 5:
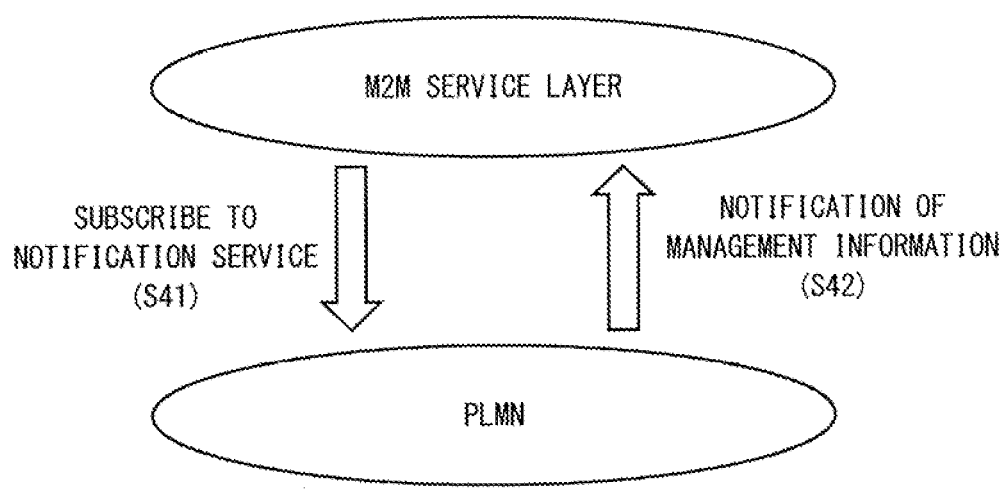
FIG. 5 is a diagram showing one example of processing in which the M2M service layer subscribes to a notification service provided by the PLMN.

Further, in a second example, the M2M service layer subscribes to a notification service provided by the PLMN 5. FIG. 5 is a conceptual diagram showing one example of processing regarding the second example. The M2M service layer (e.g., the MTC application server 4) sends a subscription request for the notification service to the PLMN 5 (S41). The M2M service layer may send the subscription request for the notification service through the reference point Tsp between the MTC-IWF entity 1 and the SCS entity 2. The PLMN 5 may send, to the M2M service layer, information indicating whether or not the subscription request has been accepted. When the subscription request has been accepted, the PLMN 5 sends, to the M2M service layer, management information which is collected by the PLMN 5 regarding the UE 3 (S42). The PLMN 5 may send the management information through the reference point Tsp.

Figure 6:
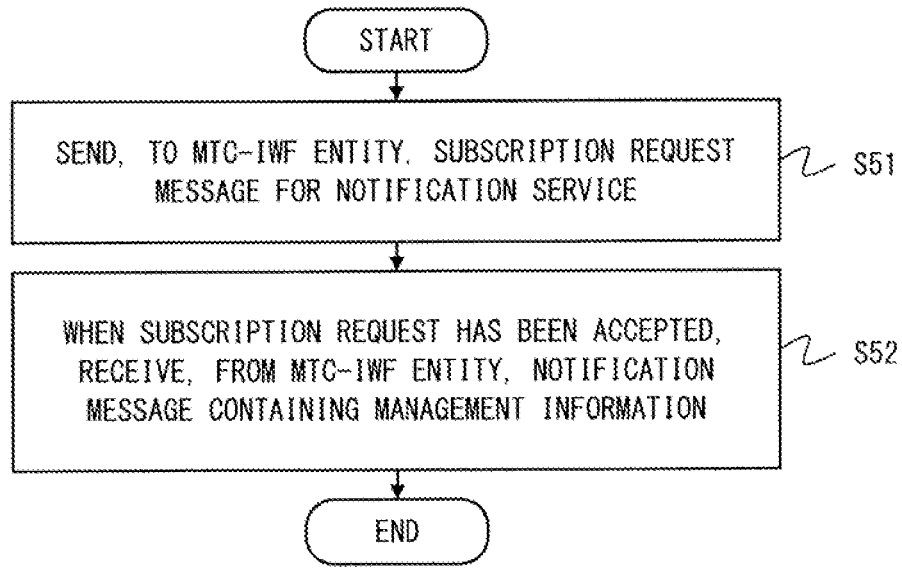
FIG. 6 is one example of a flowchart showing an operation of an SCS to subscribe to the notification service provided by the PLMN.

FIG. 6 is one example of a flowchart showing an operation of the SCS entity 2 to subscribe to the notification service provided by the PLMN 5. In the example shown in FIG. 6, the subscription request for the notification service and the management information are transferred through the reference point Tsp. More specifically, in Step S51, the SCS entity 2 sends a subscription request message for the notification service to the MTC-IWF entity 1 through the reference point Tsp. In Step S52, when the subscription request has been accepted by the PLMN 5, the SCS entity 2 receives the notification message containing the management information from the MTC-IWF entity 1 through the reference point Tsp.

Figure 7:
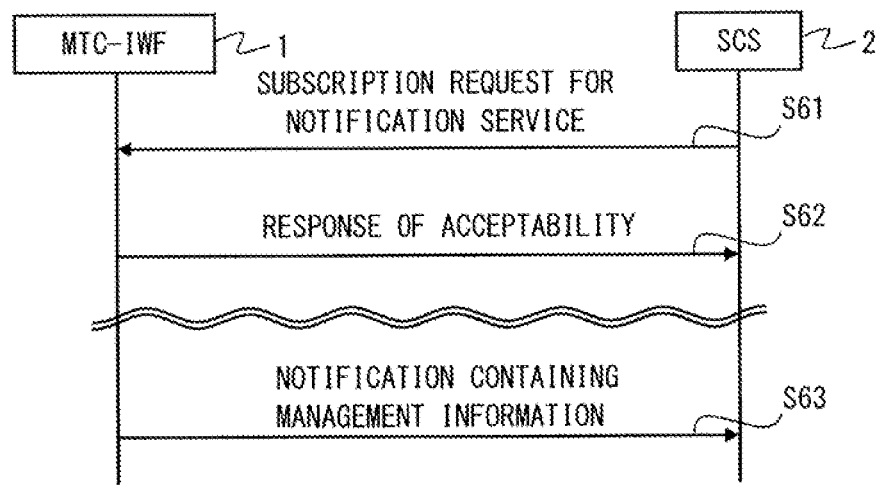
FIG. 7 is one example of a sequence diagram showing processing in which the M2M service layer subscribes to the notification service provided by the PLMN.

FIG. 7 is one example of a sequence diagram showing processing in which the M2M service layer subscribes to the notification service provided by the PLMN 5. In Step S61, the SCS entity 2 sends the subscription request for the notification service to the MTC-IWF entity 1. In Step S62, the MTC-IWF entity 1 sends, to the SCS entity 2, a response message indicating whether or not the subscription request has been accepted. In Step S63, when the subscription request has been accepted, the MTC-IWF entity 1 sends the notification message containing the management information to the SCS entity 2.

The PLMN 5 and the MTC service layer may support either one or both of the above first example (FIGS. 2 to 4) and the second example (FIGS. 5 to 7) regarding the notification of the management information.

The management information provided for the PLMN 5 from the M2M service layer in the first example is, for example, statistical information regarding communication properties or mobility properties of the UE 3 as the MTC device. The communication properties of the UE 3 include, for example, communication duration, a communication occurrence interval, the amount of communication data, or any combination thereof. The mobility properties of the UE 3 include, for example, presence/absence of mobility of the UE 3, a distance of movement of the UE 3, a moving direction of the UE 3, the repeatability of movement of the UE 3, or any combination thereof. The statistical information regarding the communication properties or the mobility properties includes, for example, an average value, a maximum value, a minimum value, and a median value regarding the communication properties or the mobility properties, or any combination thereof.

The management information provided for the M2M service layer from the PLMN 5 in the second example includes, for example, at least one of a connection state of the UE 3 to the PLMN 5, a communication state of the UE 3, and location information of the UE 3. The management information provided from the PLMN 5 may include, for example, a notification of an occurrence of an event in the PLMN 5 regarding the UE 3, location information of the UE 3, or any combination thereof. The event in the PLMN 5 regarding the UE 3 is, for example, attach, location registration/location update, deregistration from the mobility management (i.e., out of service), bearer establishment, bearer release, occurrence of an SMS communication, or occurrence of an Internet Protocol (IP) communication. The location information of the UE 3 indicates, for example, location information based on a Global Positioning System (GPS), a base station to which the UE 3 is connected, or a location registration area to which the UE 3 belongs (e.g., a routing area in a UMTS packet domain, or a tracking area in the LTE).

The notification of the management information may be performed either periodically or aperiodically. The aperiodic notification is performed in response to an occurrence of a predetermined event.

The subscription request sent from the MTC-IWF entity 1 or the SCS entity 2 for the subscription to the notification service may designate, for example, a target UE or a target UE group, a target management information type, a trigger for a notification of the management information, or a time at which a notification of the management information should be given.

As stated above, the MTC-IWF entity 1 and the SCS entity 2 according to this embodiment are configured to carry out, in addition to the device trigger procedure, a procedure for transferring the management information, which is held by the M2M service layer or the PLMN 5 regarding the UE 3, between the PLMN 5 and the M2M service layer. Accordingly, this embodiment contributes to improvement in collaborative and cooperative operations between the PLMN 5 and the M2M service layer.

Figure 8:
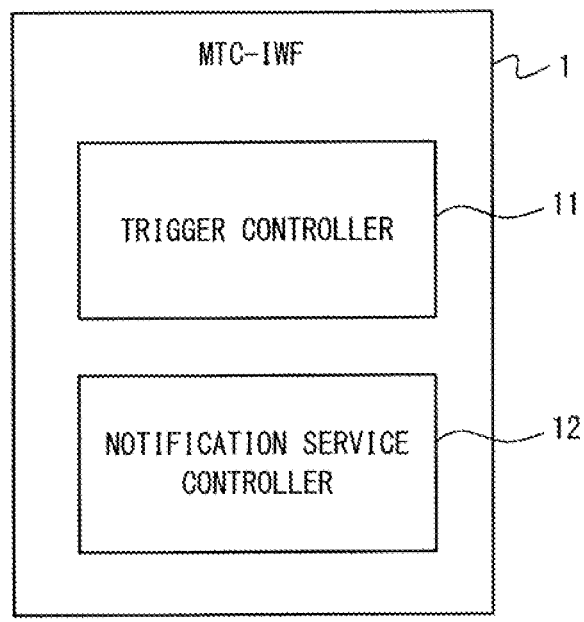
FIG. 8 is a diagram showing a configuration example of the MTC-IWF.

In the following description, a configuration example of the MTC-IWF entity 1 and the SCS entity 2 will be described. FIG. 8 is a block diagram showing a configuration example of the MTC-IWF entity 1. A trigger controller 11 communicates with the SCS entity 2 and a node in the PLMN 5 and controls a device trigger for the UE 3 as the MTC device. More specifically, the trigger controller 11 receives a device trigger request from the SCS entity 2 and exchanges signaling messages with a node in the PLMN 5 (e.g., the SMS-SC 51 or the core network node 54) to execute trigger message delivery to the UE 3. Further, the trigger controller 11 receives a result of the trigger message delivery from the node in the PLMN 5 (e.g., the SMS-SC 51 or the core network node 54) and sends the result of the trigger message delivery to the SCS entity 2.

In the first example of the notification service stated above, a notification service controller 12 sends to the SCS entity 2 the subscription request message for the notification service, and receives the notification message containing the management information from the SCS entity 2 when the subscription request has been accepted by the M2M service layer. Meanwhile, in the second example of the notification service stated above, the notification service controller 12 receives from the SCS entity 2 the subscription request message for the notification service, and sends the notification message containing the management information to the SCS entity 2 when the subscription request has been accepted by the PLMN 5.

Figure 9:
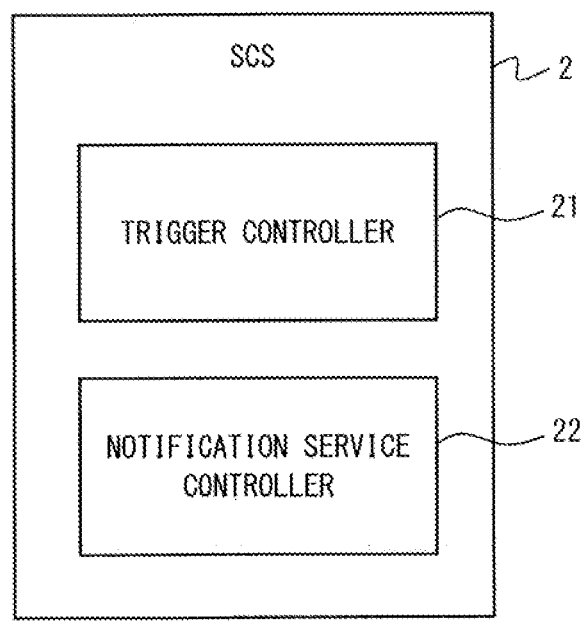
FIG. 9 is a diagram showing a configuration example of the SCS.

FIG. 9 is a block diagram showing a configuration example of the SCS entity 2. A trigger controller 21 communicates with the MTC-IWF entity 1 and the MTC application server 4 and controls a device trigger for the UE 3 as the MTC device. More specifically, the trigger controller 21 receives a device trigger request from the MTC application server 4 and sends the device trigger request to the MTC-IWF entity 1. Further, the trigger controller 21 receives the result of the trigger message delivery from the MTC-IWF entity 1 and sends the result of the trigger message delivery to the MTC application server 4.

In the first example of the notification service stated above, a notification service controller 22 receives from the MTC-IWF entity 1 the subscription request message for the notification service, and sends the notification message containing the management information to the MTC-IWF entity 1 when the subscription request has been accepted by the M2M service layer. Meanwhile, in the second example of the notification service stated above, the notification service controller 22 sends to the MTC-IWF entity 1 the subscription request message for the notification service, and receives the notification message containing the management information from the MTC-IWF entity 1 when the subscription request has been accepted by the PLMN 5.

Figure 10:
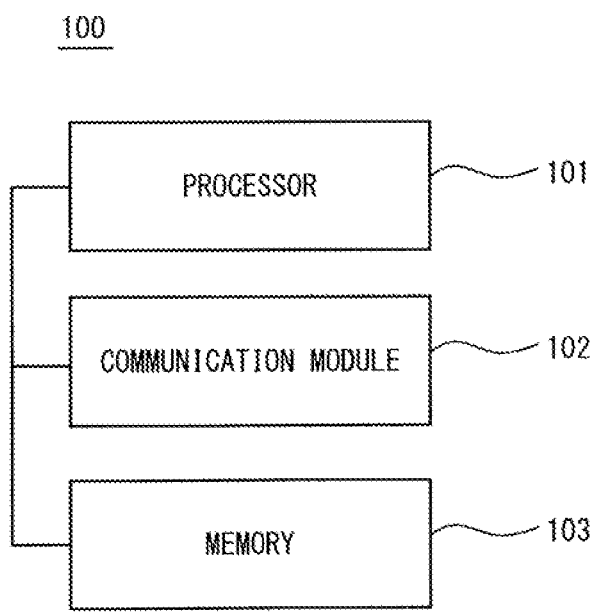
FIG. 10 is a diagram showing one example of a computer that operates as the MTC-IWF or the SCS.

Each of the MTC-IWF entity 1 and the SCS entity 2 may be implemented using a computer system that includes at least one processor. FIG. 10 is a diagram showing a configuration example of a computer system 100 that can be used as the MTC-IWF entity 1 or the SCS entity 2. A processor 101 includes at least one processing element and executes operations and functions regarding the MTC-IWF entity 1 or the SCS entity 2. The at least one processing element includes, for example, an Application Specific Integrated Circuit (ASIC), a Digital Signal Processor (DSP), a microcontroller, a microprocessor, or any combination thereof.

A communication module 102 performs communication between the components in the computer system 100. In the case of the MTC-IWF entity 1, the communication module 102 communicates with the nodes in the PLMN 5 and the SCS entity 2. In the case of the SCS entity 2, the communication module 102 communicates with the MTC-IWF entity 1 and the MTC application server 4. The communication module 102 includes hardware, firmware, software, or any combination thereof. The communication module 102 may include, for example, a network interface card that supports the IEEE 802 family of a local area network (LAN).

A memory 103 stores data and programs used by the processor 101 and the communication module 102. The memory 103 includes a volatile memory and a non-volatile memory.

The processing performed by the MTC-IWF entity 1 and the SCS entity 2 may be implemented by causing a computer system to execute a program. More particularly, one or more programs including instructions for causing the computer system to execute the algorithm described in this description using the flowcharts, the sequence diagrams and the like may be created, and this program may be supplied to the computer system.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 11:
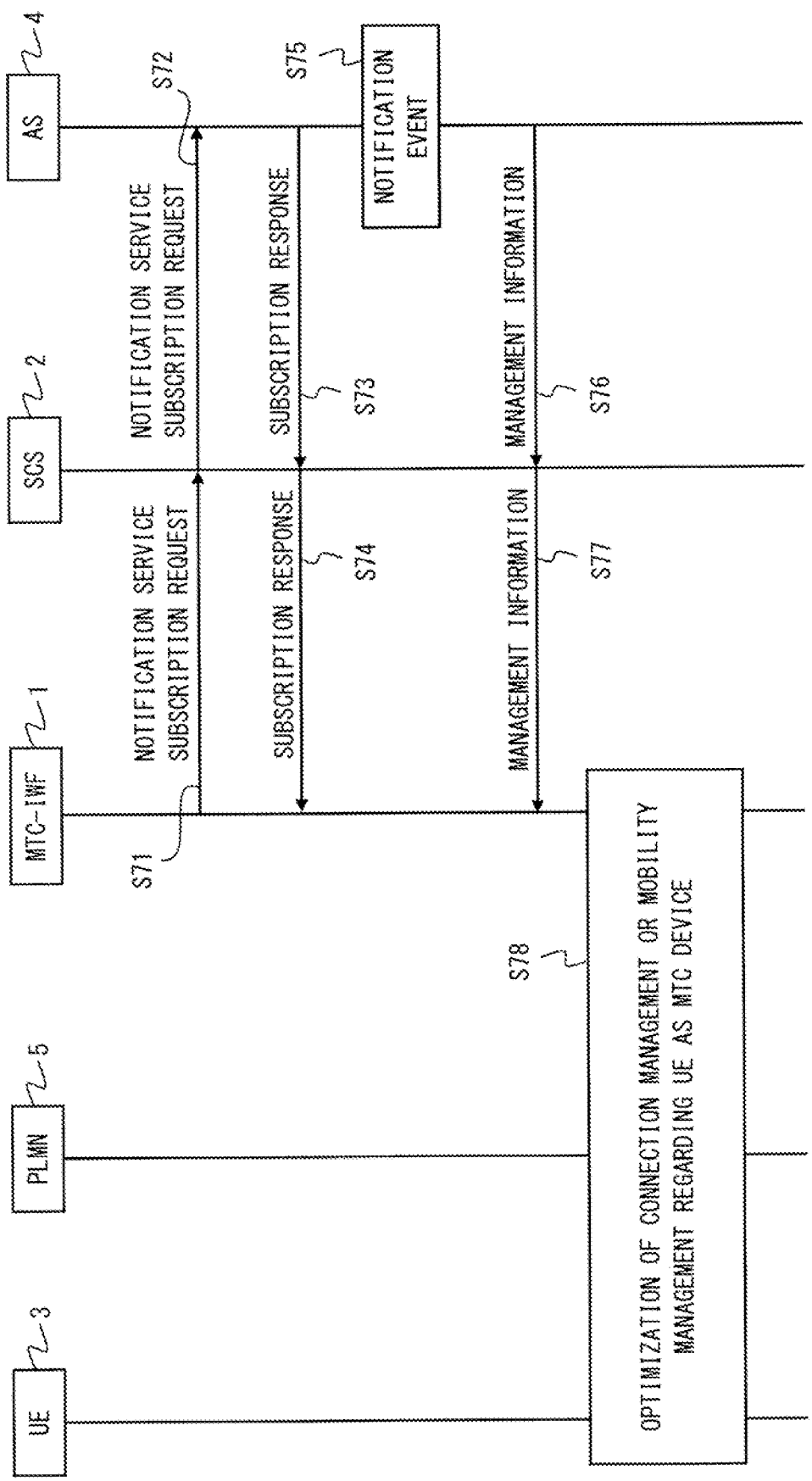
FIG. 11 is one example of a sequence diagram showing a procedure for performing UE management using the notification service provided by the M2M service layer.

In the following description, use cases of the notification service will be described. FIG. 11 shows one example of a sequence in which the PLMN 5 performs UE management utilizing the notification service provided from the M2M service layer. In Steps S71 and S72, a notification service subscription request from the PLMN 5 is sent to the MTC application server 4 from the PLMN 5 via the MTC-IWF entity 1 and the SCS entity 2. In Steps S73 and S74, a response to the subscription request is sent to the PLMN 5 from the MTC application server 4 via the MTC-IWF entity 1 and the SCS entity 2. Consider here a case in which the MTC application server 4 has accepted the subscription request. In Step S75, the MTC application server 4 detects an occurrence of a notification event of the management information. In response to the occurrence of the notification event, the MTC application server 4 sends the management information to the PLMN 5 via the MTC-IWF entity 1 and the SCS entity 2 (Steps S76 and S77).

In Step S78, the PLMN 5 optimizes the connection management or mobility management regarding the UE 3 as the MTC device using the management information received from the MTC application server 4. As already described above, the management information which is sent from the MTC application server 4 to the PLMN 5 may be statistical information regarding the communication properties or the mobility properties of the UE 3. The PLMN 5 refers to, for example, statistical information regarding communication duration or communication interval of the UE 3 and may adjust a timer value of an inactivity timer applied to the UE 3. The inactivity timer is a timer that measures a duration time of an inactive state during which user data regarding the UE 3 is neither transmitted nor received. The inactivity timer is used to determine a transition of the UE 3 from an active state (connected state) to an idle state. Further, the PLMN 5 may refer to statistical information regarding a movement amount or movement direction of the UE 3 and determine a paging area used for paging the UE 3.

Figure 12:
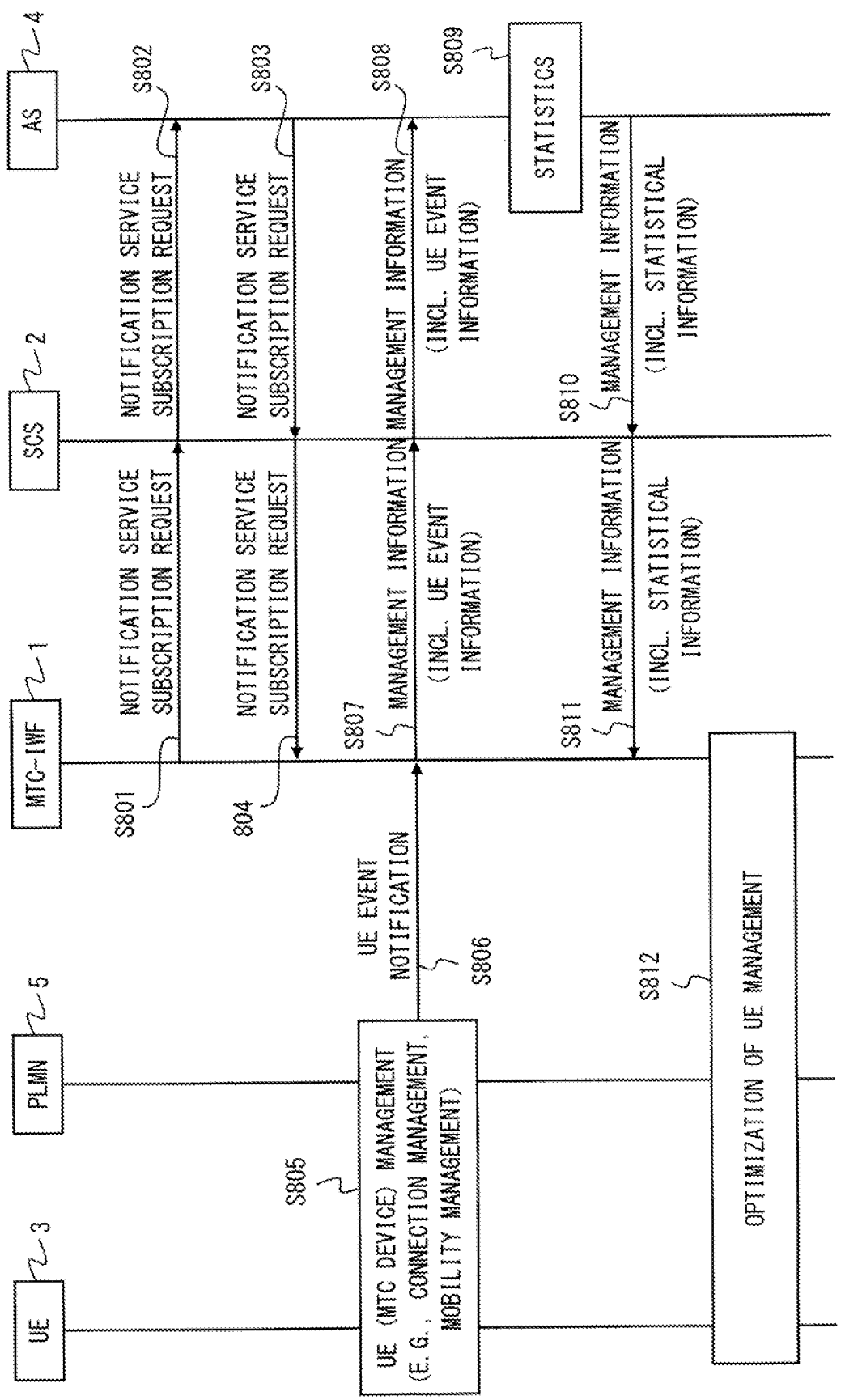
FIG. 12 is one example of a sequence diagram showing a procedure for performing UE management using both the notification service provided by the PLMN and the notification service provided by the M2M service layer.

FIG. 12 shows one example of a sequence in which UE management is performed using both the notification service provided by the M2M service layer and the notification service provided by the PLMN 5. In Steps S801 and S802, the notification service subscription request from the PLMN 5 is sent to the MTC application server 4 from the PLMN 5 through the MTC-IWF entity 1 and the SCS entity 2. In Steps S803 and S804, the notification service subscription request from the MTC application server 4 is sent to the PLMN 5 from the MTC application server 4 through the MTC-IWF entity 1 and the SCS entity 2. Consider here a case in which both two bidirectional subscription requests for the notification services are accepted.

In Steps S805 and S806, the PLMN 5 carries out connection management and mobility management of the UE 3, and notifies the MTC-IWF entity 1 of an occurrence of a predetermined event (UE event) regarding the UE 3. In Step S807, the MTC-IWF entity 1 sends, to the SCS entity 2, the management information indicating the UE event reported from the PLMN 5. In Step S808, the SCS entity 2 transfers the management information received from the MTC-IWF entity 1 to the MTC application server 4.

In Step S809, the MTC application server 4 collects the UE event reported from the PLMN 5 and executes statistical processing of the UE event (e.g., calculation of an average value). In Step S810, the MTC application server 4 requests the SCS entity 2 to send the management information indicating statistical information regarding the UE 3. In Step S811, the SCS entity 2 sends the management information to the MTC-IWF entity 1.

In Step S812, the PLMN 5 optimizes the connection management or mobility management regarding the UE 3 as the MTC device using the management information received from the MTC application server 4. The processing in Step S812 may be similar to that in Step S78 shown in FIG. 11.

Other Embodiments

In the first embodiment stated above, the example of the 3GPP radio communication network is shown. However, the first embodiment stated above may be applied to other radio communication networks that support the MTC.

Further, the embodiments stated above are merely examples regarding applications of technical ideas obtained by the present inventors. Needless to say, these technical ideas are not limited to the embodiments described above and may be changed in various ways.

This application is based upon and claims the benefit of priority from Japanese Patent Application No. 2012-280029, filed on Dec. 21, 2012, and the disclosure of which is incorporated herein in its entirety by reference.

REFERENCE SIGNS LIST

1 MACHINE TYPE COMMUNICATION INTER WORKING FUNCTION (MTC-IWF) ENTITY
2 SERVICE CAPABILITY SERVER (SCS) ENTITY
3 USER EQUIPMENT (UE)
4 MTC APPLICATION SERVER
5 PUBLIC LAND MOBILE NETWORK (PLMN)
51 SHORT MESSAGE SERVICE-SERVICE CENTER (SMS-SC)
52 HOME SUBSCRIBER SERVER (HSS)
53 CHARGING DATA FUNCTION/CHARGING GATEWAY FUNCTION (CDF/CGF)
54 CORE NETWORK NODE (E.G., SGSN, MME, MSC)
55 RADIO ACCESS NETWORK (RAN)
11 TRIGGER CONTROLLER
12 NOTIFICATION SERVICE CONTROLLER
21 TRIGGER CONTROLLER
22 NOTIFICATION SERVICE CONTROLLER
31 MTC UE APPLICATION

The invention claimed is:
1. A method implemented by a server, the method comprising:
hosting an application in an external network outside a Third Generation Partnership Project (3GPP) network;
detecting an occurrence of an event corresponding to whether a user equipment (UE) has mobility or not; and
in response to detecting the occurrence, sending to an entity in the 3GPP network, a message containing a parameter indicating whether the UE has mobility or not.
2. The method according to claim 1, wherein the parameter is related to a state transition of the UE.
3. The method according to claim 1, wherein the parameter is related to an idle period of the UE.
4. The method according to claim 1, wherein the message further contains a parameter indicating at least one of: a communication duration of the UE; or a communication interval of the UE.
5. The method according to claim 4, wherein the said sending comprises sending the message when the server is aware that at least one of the communication duration or the communication interval of the UE has changed.
6. The method according to claim 1, wherein the entity is in a Public Land Mobile Network (PLMN).
7. The method according to claim 1, further comprising receiving from the entity, before detecting the occurrence of the event, a subscription request for notifying the entity of the message containing the parameter,
wherein the subscription request designates a group of a plurality of target UEs whose event related to a location update is to be detected.
8. The method according to claim 1, further comprising receiving from the entity, before detecting the occurrence of the event, a subscription request for notifying the entity of the message containing the parameter,
wherein the subscription request designates a target type of the parameter, which indicates whether the UE has mobility or not.
9. The method according to claim 1, further comprising receiving from the entity, before detecting the occurrence of the event, a subscription request for notifying the entity of the message containing the parameter,
wherein the subscription request designates a trigger for the notifying of the message.
10. The method according to claim 1, further comprising receiving from the entity, before detecting the occurrence of the event, a subscription request for notifying the entity of the message containing the parameter,
wherein the subscription request designates a time for the notifying of the message.
11. The method according to claim 1, further comprising:
receiving from the entity, before detecting the occurrence of the event, a first subscription request for notifying the entity of statistical information regarding the UE;
sending to the entity, after receiving the first subscription request, a second subscription request for notifying the server of the event;
receiving from the entity, information indicating the event;
collecting the information indicating the event, sent from the entity; and
calculating a statistical value from the collected information indicating the event,
wherein the statistical value is the parameter indicating whether the UE has mobility or not.
12. A method implemented by an entity, the method comprising:
operating in a Third Generation Partnership Project (3GPP) network; and
receiving, a message containing a parameter indicating whether a user equipment (UE) has mobility or not, wherein the message is sent, from a server that hosts an application in an external network outside the 3GPP network, in response to the server detecting an occurrence of an event corresponding to whether the UE has mobility or not.
13. The method according to claim 12, wherein the parameter is related to a state transition of the UE.

14. The method according to claim 12, wherein the parameter is related to an idle period of the UE.

15. The method according to claim 12, wherein the message further contains a parameter indicating at least one of: a communication duration of the UE; or a communication interval of the UE.

16. The method according to claim 15, wherein the parameter is sent when the server is aware that at least one of the communication duration or the communication interval of the UE has changed.

* * * * *